(12) United States Patent
Rothschild

(10) Patent No.: US 8,275,093 B2
(45) Date of Patent: Sep. 25, 2012

(54) WALK-THROUGH SHOE INSPECTION SYSTEM

(75) Inventor: Peter J. Rothschild, Newton, MA (US)

(73) Assignee: American Science and Engineering, Inc., Billerica, MA (US)

( * ) Notice: Subject to any disclaimer, the term of this patent is extended or adjusted under 35 U.S.C. 154(b) by 266 days.

(21) Appl. No.: 12/845,258

(22) Filed: Jul. 28, 2010

(65) Prior Publication Data

US 2011/0026674 A1     Feb. 3, 2011

Related U.S. Application Data

(60) Provisional application No. 61/229,949, filed on Jul. 30, 2009.

(51) Int. Cl.
*G01N 23/083* (2006.01)
(52) U.S. Cl. ............................ 378/62; 378/53; 378/57
(58) Field of Classification Search ............ 378/53, 378/57, 62
See application file for complete search history.

(56) References Cited

U.S. PATENT DOCUMENTS

| | | | | |
|---|---|---|---|---|
| 4,357,535 A * | 11/1982 | Haas | | 378/57 |
| 5,943,388 A * | 8/1999 | Tumer | | 378/98.9 |
| 6,094,472 A * | 7/2000 | Smith | | 378/86 |
| 6,507,025 B1 * | 1/2003 | Verbinski et al. | | 250/358.1 |
| 6,665,373 B1 * | 12/2003 | Kotowski et al. | | 378/90 |
| 6,785,360 B1 * | 8/2004 | Annis | | 378/137 |
| 7,016,473 B1 * | 3/2006 | Linev et al. | | 378/146 |
| 7,397,892 B2 * | 7/2008 | Linev | | 378/57 |
| 7,505,562 B2 * | 3/2009 | Dinca et al. | | 378/87 |
| 7,561,666 B2 * | 7/2009 | Annis | | 378/87 |
| 7,796,733 B2 * | 9/2010 | Hughes | | 378/87 |
| 7,796,734 B2 * | 9/2010 | Mastronardi et al. | | 378/90 |
| 7,806,589 B2 * | 10/2010 | Tashman et al. | | 378/197 |

OTHER PUBLICATIONS

Moro-oka et al., "Dynamic Activity Dependence of in Vivo Normal Knee Kinematics," *Journal of Orthopaedic Research*, pp. 1-7 (2007).

* cited by examiner

*Primary Examiner* — Allen C. Ho
(74) *Attorney, Agent, or Firm* — Sunstein Kann Murphy & Timbers LLP

(57) ABSTRACT

An apparatus and method for x-ray inspection of footwear while the footwear is worn on the feet of walking persons. A source of penetrating radiation, such as an x-ray tube, mounted on one side of a system, provides a fan beam of penetrating radiation contained in a substantially vertical plane, while a detector, disposed on the opposing side of the system, detects penetrating radiation that has traversed the footwear. A controller creates an image of the footwear. The system may have a sensor for detecting presence of the person and for initiating operation of the source of penetrating radiation in response thereto. The system may be installed inside a portal including a metal detector portal.

13 Claims, 3 Drawing Sheets

WALK-THROUGH SHOE INSPECTION SYSTEM

The present invention claims priority from U.S. Provisional Patent Application Ser. No. 61/229,949, filed Jul. 30, 2009, which is incorporated herein by reference.

TECHNICAL FIELD

The present invention relates to systems and methods for inspecting objects with penetrating radiation, and, more particularly, the invention relates to inspection systems for inspecting the footwear of a person while worn on the person's feet.

BACKGROUND ART

Since the attempted shoe-bombing of a US commercial aircraft shortly after the attacks of Sep. 11, 2001, there has been a concerted effort to develop automated systems capable of detecting explosive devices concealed in footwear worn by airline passengers. While some progress has been made towards this goal, a reliable detection method with a high probability of detection and a low false alarm rate has remained elusive.

Currently, most airports implement the requirement to inspect footwear by having passengers remove their shoes before passing them through the x-ray inspection machines used to inspect carry-on baggage. The relatively high-resolution dual-energy images from these systems are effective at allowing an operator to detect any concealed explosives and associated wires and detonators. Unfortunately, however, the extra time involved with passengers removing, and subsequently reclaiming, their shoes significantly slows down the throughput of the security checkpoints. It therefore remains a top priority of organizations responsible for aviation security to come up with methods for inspecting shoes that do not require that passengers remove their footwear.

While transmission imaging has been practiced since the time of Röntgen, it has never been practical to obtain useful information with respect to a person's footwear while the person was walking—nor was the concept ever suggested. This is largely because the direct-conversion detector arrays required to produce very high resolution images with the required high readout rates and 100% detection efficiency (so as to enable an extremely low radiation dose to the foot) have not, until recently, been available at a cost that makes such a concept practical.

Knees have been imaged in motion in x-ray transmission for motion studies (University of Florida) using two-dimensional areal arrays of detectors that typically use scintillator material to convert the incident x-ray energy into light, which is subsequently detected by photodetectors such as photodiodes. This is a very inefficient process, and more x-rays must therefore be incident on the imaged object to create an image that is comparable to that obtained with a solid-state, direct conversion detector array, in which each x-ray is detected directly in the semiconductor material with 100% efficiency. Moreover, scintillator based areal arrays typically operate in current integration mode, rather than in the more effective photon-counting mode of the solid-state arrays. The scintillator-based areal arrays therefore result in a much larger dose to an imaged object than would be acceptable in an application such as scanning the feet of travelers. In addition, areal arrays are typically too costly for security applications and are also subject to image degradation due to the detection of scattered x-rays. Finally, no scheme of post-collimators has yet proven practical with a highly segmented areal array, yet, post-collimation would be necessary to prevent the detection of scattered radiation.

Detection of concealed explosives in shoes presents peculiar resolution requirements, and deployment in an airport context where travelers are subject to cumulative dose limitations, imposes limitations on the spectrum and flux available. Moreover, the integration time is limited by the requisite passenger throughput to about 1-2 ms per image line in order to achieve a useful image resolution. Therefore, it has been believed to date that the only practical way to detect explosives in shoes is either by removing the shoes and passing them through a regular baggage x-ray screening device or by the detection of explosive materials by chemical trace detection using mass spectroscopy and/or gas chromatography techniques, or by bulk detection techniques such as Nuclear Quadrupole Resonance (NQR) or electro-magnetic dielectric analysis.

SUMMARY OF EMBODIMENTS OF THE INVENTION

In various embodiments of the present invention, an inspection system is provided for inspecting footwear of an ambulant shod person. The system has a source of penetrating radiation mounted on the first side of the system for providing a fan beam of penetrating radiation contained in a substantially vertical plane, exposing each foot to a dose of penetrating radiation of no more than 25 µR, a collimated linear array of photon-counting detectors disposed on the opposing side of the system, and a controller for creating an image of the footwear of the person.

In other embodiments of the invention, the source of penetrating radiation includes an x-ray source. The system may also have a sensor for detecting presence of the ambulant shod person and for initiating operation of the source of penetrating radiation in response thereto. The system may be installed inside a portal, such as a magnetometer portal.

In further embodiments of the invention, the source of penetrating radiation may include a line collimator. The sensor may be an infrared detector for sensing interruption of an infrared beam. An interlock may be provided for shutting off the source of penetrating radiation in response to insufficient motion of the shod person through the beam plane. The system may also have a motion sensor for providing a motion signal and a controller for governing operating conditions of the source based at least on the motion signal.

In accordance with another aspect of the invention, a method is provided for inspecting footwear of an ambulant shod person. The method has steps of:

a. detecting presence of the person between a first side and an opposing side of a portal;
b. in response to detection of the presence of the person, successively irradiating the footwear of the person with a fan beam of penetrating radiation emanating from a first side of the portal;
c. detecting penetrating radiation that has traversed the footwear of the shod person; and
d. creating an image of penetrating radiation after traversal of the footwear of the shod person.

In other embodiments of the invention, the image may be displayed to an operator. There may be additional steps of detecting motion of the person and governing parameters of the fan beam of penetrating radiation based on the motion of the person. The additional step of detecting motion of the person can also be used to remove distortions from the image of the footwear, due to any variation in the speed with which the person walks through the system. The step of displaying may include presenting the image on a monitor used for viewing luggage and/or on a separate monitor dedicated to the shoe scanner.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In accordance with preferred embodiments of the present invention, a system is provided that allows high-resolution x-ray images of a person's footwear to be acquired as the subject walks through the system. In order not to affect the throughput of the checkpoint, the inspection system can be installed in or in front of a metal detector portal (or a magnetometer portal), or in the general vicinity of a portal, which also means no additional space needs to be taken up with equipment.

By using a low energy x-ray source with an end point energy typically in the range 50 kV-80 kV and an extremely efficient solid-state linear detector array operating in photon-counting mode, the maximum dose to the foot may advantageously be kept below 10-25 μR per inspection, depending on the image quality and the maximum walking speeds that are required. (As used herein, efficiency refers to quantum efficiency, in the sense that for a 95% efficient detector array, at least 95% of incident x-rays contribute to the detection signal).

Recently, highly-segmented (0.4-mm pitch) solid-state linear arrays containing Cadmium Zinc Telluride (CZT) or Cadium Telluride (CdTe) detector elements have become available, with high readout rates (up to 1,000 lines per second). Unlike most scintillator-based detector arrays, the CZT and CdTe linear arrays can operate in photon counting mode in which each x-ray photon is individually detected and counted. In addition, a measurement of the energy of each detected x-ray can be performed, allowing dual or multi-energy analysis to be carried out for the inspected object. This information can then be used to determine the effective atomic number of each component within the object.

Figure 1A:
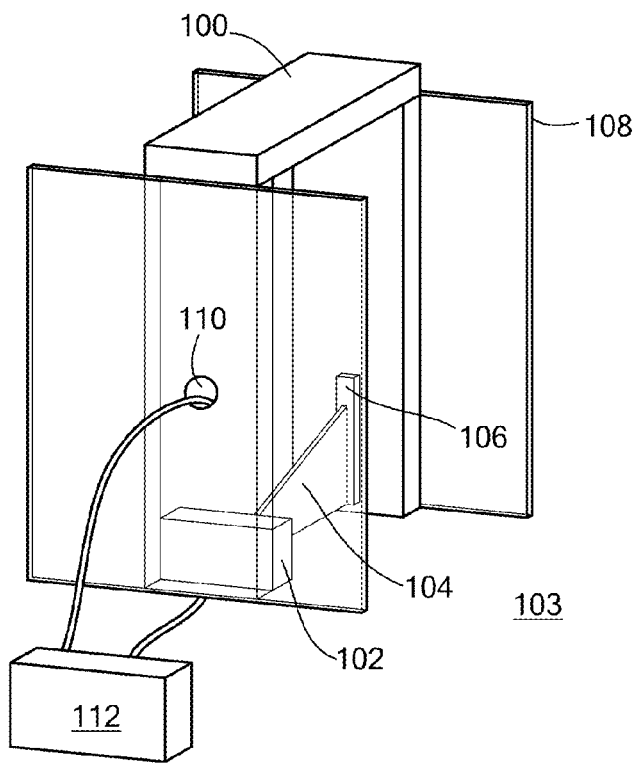
FIG. 1A shows a perspective view of a shoe imaging system in accordance with embodiments of the present invention.

Operation of certain embodiments of the invention is now described with reference to FIG. 1A. A person (not shown) stands in front of a metal detector portal 100, and when directed to do so, walks slowly through the portal. Footprint markers on the floor (not shown) may be used to conveniently show subjects where to initially place their feet. A sensor 110, such as an infrared detector used in conjunction with interruption of an infrared beam, detects the presence of the ambulant person, and activates an x-ray source 102 mounted on one side of the portal, close to the floor 103. As used herein and in any appended claims, the term "ambulant person" refers to a person who is walking.

Source 102, which may include an x-ray tube and a collimator, creates a fan-beam 104 of penetrating radiation, which is incident on a detector array 106 located on the opposite side of the portal from the source. An end-point energy for the source is preferably about 50-80 kV, and the anode current is typically about 0.5-4.0 mA, depending on the walk-through speed, although the choice of other operating parameters falls within the scope of the present invention. Fan beam 104 illuminates a region high enough above the floor to ensure that the shoes of an inspected person are fully illuminated, regardless of the person's gait. Typically, a height of about 30 cm at the center of the portal is sufficient to image all footwear and gait combinations.

An important characteristic of detector array 106 employed for scanning shoes or other footwear is the Signal to Noise Ratio (SNR). The signal, in this case, is the number of x-rays detected and counted in a given energy bin in a given detector element during an integration period (typically 1-2 ms). The background consists of counts in a detector element due to internal and/or external radioactive decay events, thermal noise induced in the semiconductor detector material, and electronic noise. If the detector material is chosen carefully, internal radioactivity can be minimized, and thermal noise can be kept to reasonable levels by operating the detector array at room temperature, or lower. By operating the detector in photon-counting mode, the lower threshold can be advantageously set to exclude background noise events, which typically have smaller output pulses than those from the detected x-rays. This greatly increases the SNR compared with areal scintillator arrays, which typically operate in integration mode and integrate both the background pulses and signal pulses together into one combined output signal. Another source of background for transmission imaging systems is in-scatter of the penetrating radiation. This occurs when x-rays from the source are scattered by the object being inspected out of the fan beam, and into the incorrect detector element. This can "fog" the image by reducing the contrast (especially in highly attenuating regions), and tends to blur object edges. The in-scatter background can be greatly reduced by carefully collimating the source so as to create a fan beam that is only slightly wider than is needed to illuminate the detector elements, and by providing a post-collimator on the detector array which prevents out-of-plane in-scatter from reaching the detectors.

In certain embodiments of the invention, it is advantageous to have sophisticated computer algorithms analyze the footwear images in order to automatically detect threats or anomalous features. Such algorithms can include, but are not limited to: comparison of the images with a pre-loaded database of x-ray images of threat-free footwear; comparison of the left and right foot images to look for anomalous differences between them; detection of suspect items (such as wires, batteries, detonators, and explosives) using pattern recognition techniques; and material identification using multi-energy x-ray transmission analysis. All or some of these techniques can be combined, with the goal of automatically clearing a large fraction of the passengers without a human operator having to examine the footwear images. The system then becomes a red light/green light system, with an operator only having to become involved if a threat is detected (red light). The alarm resolution may then be carried out in several ways: the passenger is asked to remove their shoes and place them on the belt of the baggage x-ray inspection system; the shoe scanner presents an image of the suspect footwear to the metal detector portal operator, with the display monitor conveniently located near the portal; or the images acquired from the system may be automatically sent to be viewed by the same operators who are using the baggage inspection systems, resulting in the need for no additional operators.

Figure 1B:
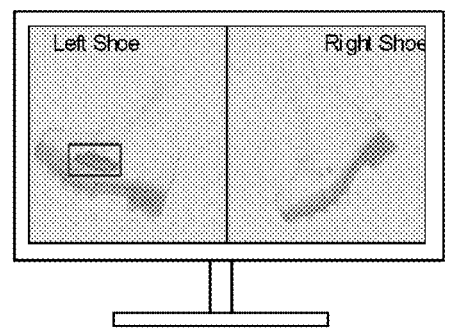
FIG. 1B depicts a typical display of each shoe as it appears on a video console in accordance with an embodiment of the present invention.

FIG. 1B depicts transmission images of the left and right shoes of an inspected person, as they might appear on a monitor console for inspection by an operator.

Figure 2:
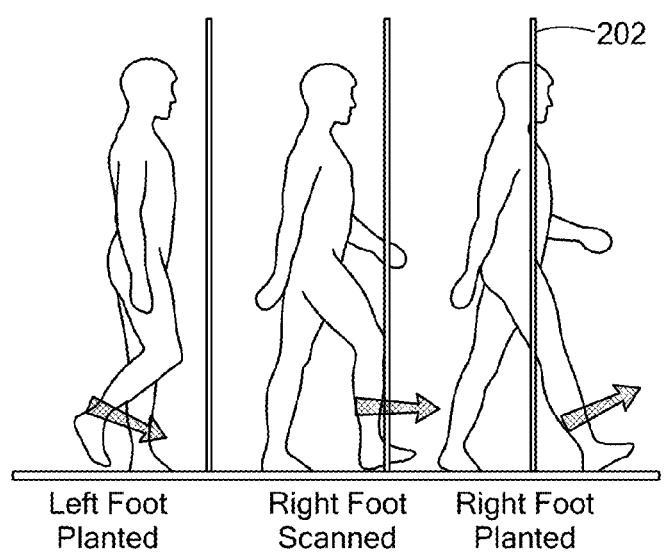
FIG. 2 illustrates the means by which a person's right foot is scanned as it passes through the beam plane.

FIG. 2 illustrates how the right foot is imaged as a person walks through the system. The starting position is indicated by the figure standing on the left, with his left foot planted. When asked to do so, the person steps forward with the right leg, and the right foot is imaged as it passes through the beam plane (center figure), where the beam plane is designated by the vertical lines 202. The person then plants the right foot on the far side of the beam plane (right figure), before stepping forward with the left foot (not shown in illustration). The left foot is then imaged in a similar way, although the orientation of the left foot with respect to the beam may be slightly different compared with the right foot. The figure is for illustrative purposes, and, of course, the order of imaging of the left foot and right foot is immaterial to operation of the invention.

Figure 3:
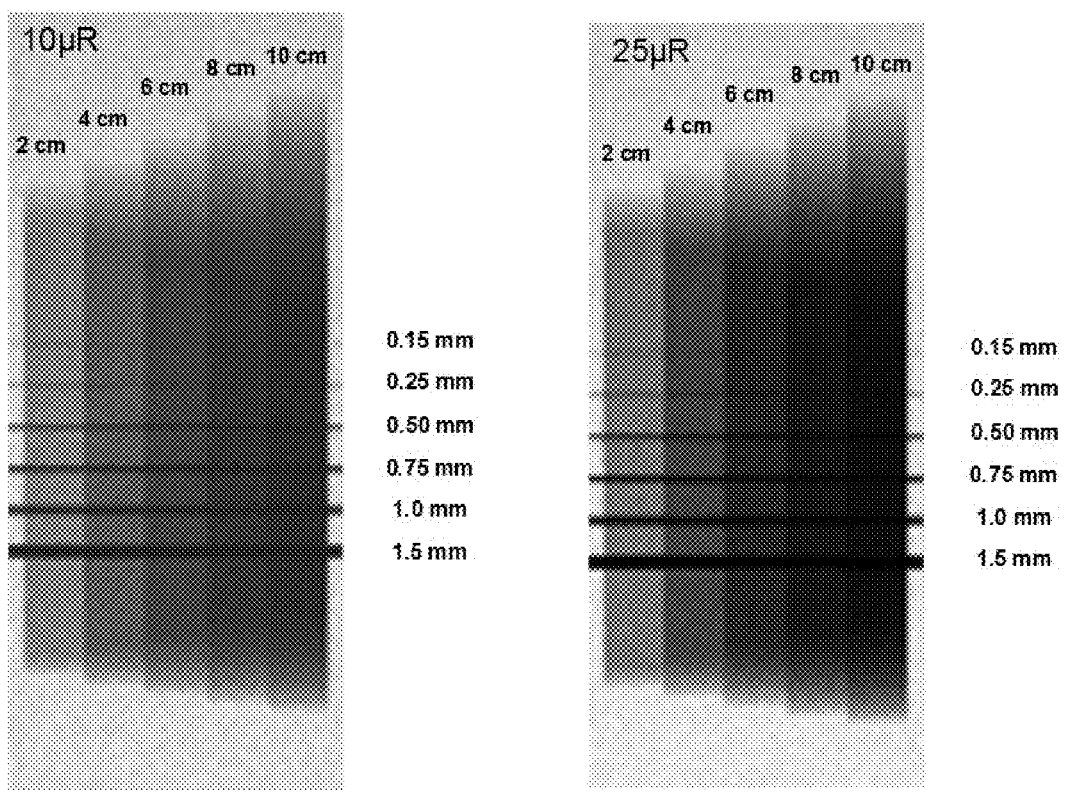
FIG. 3 shows computer generated 60 kV transmission images of steel wires with diameters between 0.15 mm and 1.5 mm, behind a step-wedge of synthetic rubber, with steps of thickness 2 cm to 10 cm.

FIG. 3 depicts computer simulations that were carried out to estimate the image quality to be obtained with a dose of 10 μR and 25 μR (to each foot). A source voltage of 60 kV is preferred and was chosen for the simulation, as this was found to maximize the contrast of small metallic wires in the image. For some types of footwear, however, it may be found that higher endpoint energies are advantageous. Shown are computer-generated 60 kV transmission images of steel wires with diameters between 0.15 mm and 1.5 mm, behind a step-wedge of synthetic rubber, with steps of thickness 2 cm to 10 cm. The detector array contained pixels with 1 mm pitch and 2 mm width. The line separation was 1.5 mm. For a foot speed of 3 m/second, the integration time corresponds to 0.5 ms, and the left and right images correspond to an anode current of about 0.5 mA and 1.3 mA, respectively.

It can be seen from the images that even for a dose to each foot of only 10 μR per scan, a 0.15 mm steel wire can be seen behind up to 10 cm of solid synthetic rubber. The new ANSI N43.17 standard for personnel inspection will allow a dose of up to 25 μR per inspection.

Figure 4:
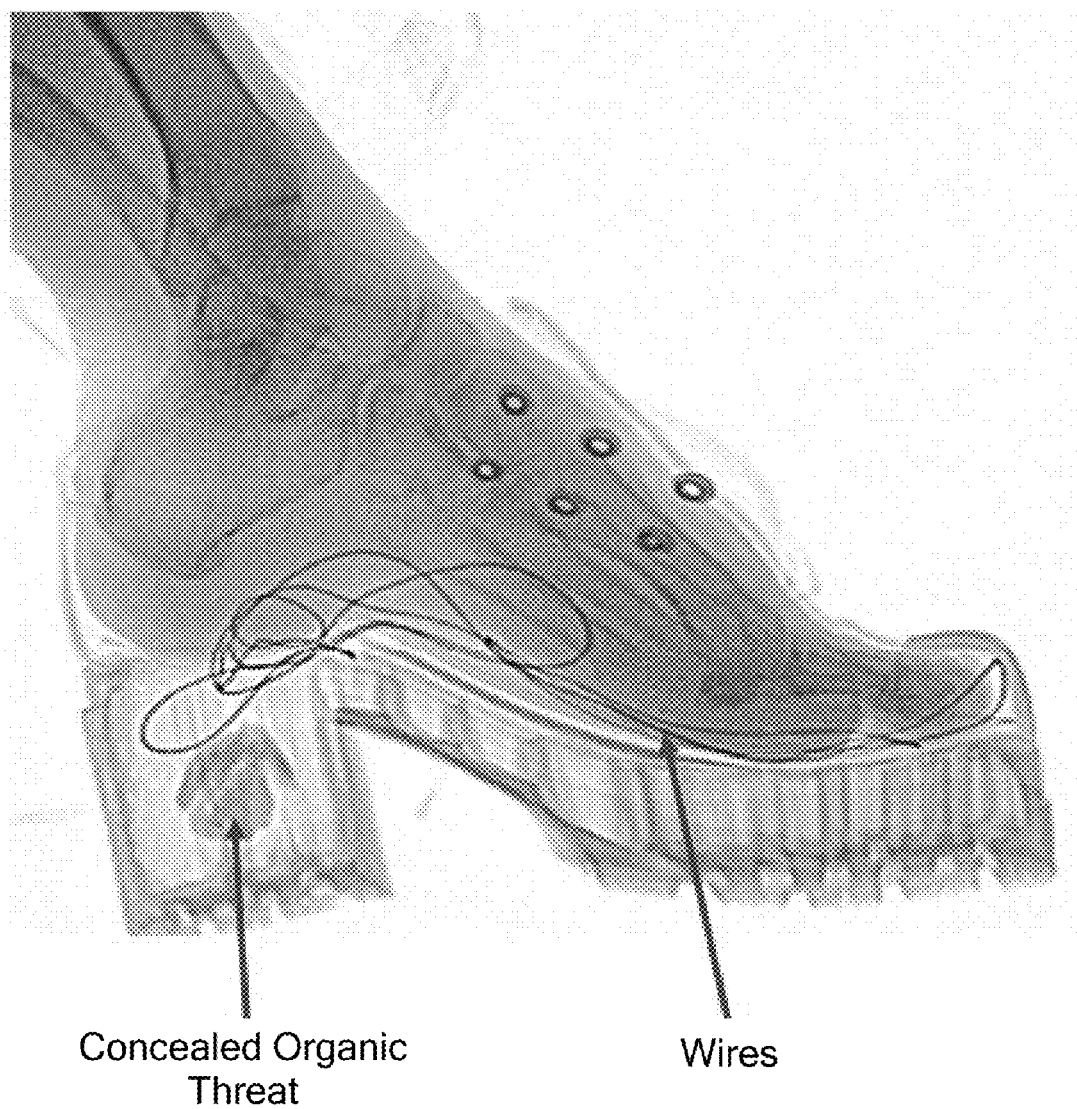
FIG. 4 is a high-resolution 140 kV dual-energy transmission x-ray image of a foot in a high-heeled shoe.

One advantage of the current invention is the favorable sideways orientation of the viewing direction with respect to the foot. This allows for an unobstructed view of the sole and heel of the shoe, without the x-rays passing through both the bottom of the shoe (where a bomb would likely be concealed) and the foot. FIG. 4 shows a medium-resolution dual-energy transmission image taken at 140 kV of an actual human foot in a high-heeled shoe. An explosive simulant concealed in the heel is clearly visible, as are the wires that are used to activate the detonator. Note that the sideways viewing angle enables the foot and the heel and sole of the shoe not to overlap in the image, making image interpretation much easier, for both operators and for automatic threat detection algorithms One of the major concerns with any x-ray system that scans personnel is radiation safety. Although the system is inherently low-dose, safety interlock systems are provided to ensure that if a part of the body is stationary in the region illuminated by the x-rays, the system shuts off the x-rays automatically. This may be achieved using a video camera and tracking software, or using another kind of speed or motion sensor 110. In addition, the intensity of the x-rays may be modified by a controller 112 depending on the speed with which the person is walking through the system, based on data derived from sensor 110, in order to ensure that the dose is kept below some prescribed limit.

The amount of radiation that is scattered out of the fan beam into the surrounding environment must also be kept to a minimum. This can be achieved by using a narrow fan beam and by using a slit collimator in front of the detector array which captures and absorbs radiation that is scattered from the front faces of the detector elements. In addition, scatter shields 108 (such as lead or tin-impregnated plastic) may be strategically placed around the system as shown in FIG. 1A, to absorb any residual radiation scattered into the surrounds of the system.

The footwear images that are acquired can be displayed on the same screens that are used to display the x-ray images of the carryon bags. This means that no additional personnel are required to carryout the task of shoe inspection. Alternatively, the images may be displayed on a separate dedicated display monitor that is next to the shoe scanner, or in close proximity to the monitors used to view the carryon bags.

In addition to just presenting dual or multi-energy images to the operator, advances in the field of pattern recognition and image segmentation may be used to look for anomalous or suspicious objects in the images, as previously described. For example, in one embodiment of the invention, the heel of the shoe is identified by a segmentation module embodied in software. Segmentation algorithms are taught, for example, in Zhang, *Advances in Image and Video Segmentation*, (IRM Press, 2006), and in Duda, et al., *Pattern Classification* (2d ed., Wiley, 2001), both of which are incorporated herein by reference. Suspicious voids, dense masses, or metallic items that are not recognized as inserts may be automatically flagged for the operator, using algorithms described in the foregoing treatises.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. An inspection system for inspecting footwear of an ambulant shod person, the system characterized by a first side and an opposing side, the system comprising:
   a. a source of penetrating radiation mounted on the first side of the system for providing a fan beam of penetrating radiation contained in a substantially vertical plane that traverses at least one foot of the ambulant shod person during the course of walking and exposes each foot to a dose of penetrating radiation of no more than 25 μR;
   b. a collimated linear array of photon-counting detectors disposed on the opposing side of the system for detecting penetrating radiation that has traversed the footwear of the ambulant shod person and generating a transmission signal; and
   c. a segmenting module implemented in software on a controller for identifying anomalies in the footwear of the ambulant shod person on a basis of the transmission signal.

2. The inspection system as set forth in claim 1, wherein the source of penetrating radiation includes an x-ray source.

3. The inspection system as set forth in claim 1, further comprising a sensor for detecting presence of the ambulant shod person and initiating operation of the source of penetrating radiation in response thereto.

4. The inspection system as set forth in claim 3, wherein the sensor is an infrared detector for sensing interruption of an infrared beam.

5. The inspection system as set forth in claim 1, wherein the system is installed in close proximity to a portal including a metal detector portal.

6. The inspection system as set forth in claim 1, wherein the source of penetrating radiation includes a line collimator.

7. The inspection system as set forth in claim 1, further comprising an interlock for shutting off the source of penetrating radiation in response to insufficient motion of the shod person.

8. The inspection system as set forth in claim 1, further comprising:
- a motion sensor for providing a motion signal; and
- a controller for governing operating conditions of the source based at least on the motion signal.

9. A method for inspecting footwear of an ambulant shod person, the method comprising:
- a. detecting presence of a person between a first side and an opposing side of a portal;
- b. in response to detection of the presence of the person, successively irradiating footwear of the person with a fan beam of penetrating radiation emanating from the first side of the portal;
- c. detecting penetrating radiation that has traversed the footwear of the shod person; and
- d. creating an image of penetrating radiation after traversal of the footwear of the shod person.

10. The method set forth in claim 9, further comprising:
detecting motion of the person; and
governing parameters of the fan beam of penetrating radiation based on the motion of the person.

11. The method set forth in claim 9, wherein the step of creating includes presenting the image on a dedicated monitor used for viewing footwear images.

12. The method set forth in claim 9, wherein the step of creating includes presenting the image on a monitor used for viewing luggage.

13. The method set forth in claim 9, wherein the created image is analyzed by algorithms to automatically alert an operator to the presence of threat items in the footwear.

* * * * *